United States Patent
Celik et al.

(10) Patent No.: US 9,438,146 B2
(45) Date of Patent: Sep. 6, 2016

(54) REDUCING THE POWER CONSUMPTION OF A BRUSHLESS MOTOR

(71) Applicant: Dyson Technology Limited, Wiltshire (GB)

(72) Inventors: Tuncay Celik, Swindon (GB); Libo Zheng, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/304,441

(22) Filed: Jun. 13, 2014

(65) Prior Publication Data

US 2014/0368136 A1    Dec. 18, 2014

(30) Foreign Application Priority Data

Jun. 13, 2013  (GB) .................................. 1310570.5

(51) Int. Cl.
*H02P 3/00* (2006.01)
*H02P 6/00* (2016.01)
*H02P 29/00* (2016.01)

(52) U.S. Cl.
CPC .............. *H02P 6/002* (2013.01); *H02P 6/15* (2016.02); *H02P 6/28* (2016.02); *H02P 29/0044* (2013.01)

(58) Field of Classification Search
CPC .. H02P 29/005; H02P 6/002; H02P 29/0044; H02P 31/00
See application file for complete search history.

(56) References Cited

U.S. PATENT DOCUMENTS

| 6,496,340 B1 | 12/2002 | Hornberger et al. |
| 7,400,109 B2 | 7/2008 | Nomura et al. |
| 2003/0034699 A1 | 2/2003 | Selewski et al. |
| 2005/0244263 A1 | 11/2005 | Hardt et al. |
| 2007/0231121 A1 | 10/2007 | Baecke et al. |
| 2008/0074068 A1 | 3/2008 | Takeuchi |
| 2010/0039055 A1 | 2/2010 | Jeung |
| 2011/0247652 A1 | 10/2011 | Zimmer |
| 2011/0254480 A1 | 10/2011 | Chen et al. |
| 2012/0026771 A1* | 2/2012 | Imura ................... B60L 3/0015 363/178 |
| 2013/0063061 A1 | 3/2013 | Hanada |
| 2013/0261865 A1* | 10/2013 | Toki ........................ B60K 6/48 701/22 |
| 2014/0368144 A1 | 12/2014 | Celik |

FOREIGN PATENT DOCUMENTS

| JP | 5-344781 | 12/1993 |
| JP | 2000-184502 | 6/2000 |
| JP | 2001-136771 | 5/2001 |
| JP | 2003-291832 | 10/2003 |
| JP | 2007-166830 | 6/2007 |

(Continued)

OTHER PUBLICATIONS

Search Report dated Oct. 29, 2013 directed towards GB Application No. 1310570.5; 2 pages.

(Continued)

*Primary Examiner* — Karen Masih

(74) *Attorney, Agent, or Firm* — Morrison & Foerster LLP

(57) ABSTRACT

A method of controlling a brushless motor. The method includes measuring a temperature of the motor, adjusting a control value in the event that the measured temperature is lower than a threshold, and exciting a winding of the motor. The control value is then used to define an attribute of excitation, and the adjustment to the control value reduces the input power of the motor.

27 Claims, 8 Drawing Sheets

(56) References Cited

FOREIGN PATENT DOCUMENTS

| | | |
|---|---|---|
| JP | 2008-516128 | 5/2008 |
| JP | 2009-171640 | 7/2009 |
| JP | 2009-189181 | 8/2009 |
| JP | 2009-198139 | 9/2009 |
| JP | 2010-178405 | 8/2010 |

OTHER PUBLICATIONS

International Search Report and Written Opinion mailed Nov. 21, 2014, directed to International Application No. PCT/GB2014/051783; 12 pages.

Search Report dated Feb. 29, 2016, directed to GB Application No. 1513844.9; 1 page.

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-Right |
| 0 | 1 | 1 | 0 | 0 | 1 | 1 | 0 | Excite Right-to-Left |
| 0 | 1 | 0 | 1 | 0 | 1 | 0 | 1 | Freewheel |

| Speed (rpm) | Temperature (deg C) | | | | | | | | | | | | | | |
|---|---|---|---|---|---|---|---|---|---|---|---|---|---|---|---|
| | 0-4 | 5-8 | 9-12 | 13-16 | 17-20 | 21-24 | 25-28 | 29-32 | 33-36 | 37-40 | 41-44 | 45-48 | 49-52 | 53-56 | 57-60 |
| 89820 | -2.00 | -1.75 | -1.50 | -1.50 | -1.25 | -1.00 | -1.00 | -0.75 | -0.50 | -0.25 | 0 | 0 | 0 | 0 | 0 |
| 90909 | -2.00 | -2.00 | -1.75 | -1.50 | -1.50 | -1.25 | -1.00 | -1.00 | -0.75 | -0.50 | -0.25 | 0 | 0 | 0 | 0 |
| 92024 | -2.25 | -2.00 | -1.75 | -1.75 | -1.50 | -1.25 | -1.00 | -1.00 | -0.75 | -0.50 | -0.25 | 0 | 0 | 0 | 0 |
| 93167 | -2.25 | -2.00 | -1.75 | -1.75 | -1.50 | -1.25 | -1.00 | -1.00 | -0.75 | -0.50 | -0.25 | 0 | 0 | 0 | 0 |
| 94339 | -2.25 | -2.00 | -1.75 | -1.75 | -1.50 | -1.25 | -1.00 | -1.00 | -0.75 | -0.50 | -0.25 | 0 | 0 | 0 | 0 |
| 95541 | -2.25 | -2.25 | -2.00 | -1.75 | -1.75 | -1.50 | -1.25 | -1.00 | -1.00 | -0.75 | -0.50 | -0.25 | 0 | 0 | 0 |
| 96774 | -2.25 | -2.25 | -2.00 | -2.00 | -1.75 | -1.50 | -1.25 | -1.00 | -1.00 | -0.75 | -0.50 | -0.25 | 0 | 0 | 0 |
| 98039 | -2.50 | -2.25 | -2.00 | -2.00 | -1.75 | -1.50 | -1.25 | -1.00 | -1.00 | -0.75 | -0.50 | -0.25 | 0 | 0 | 0 |
| 99337 | -2.50 | -2.50 | -2.25 | -2.00 | -2.00 | -1.75 | -1.50 | -1.25 | -1.00 | -1.00 | -0.75 | -0.50 | -0.25 | 0 | 0 |
| 100671 | -2.50 | -2.50 | -2.25 | -2.00 | -2.00 | -1.75 | -1.50 | -1.25 | -1.00 | -1.00 | -0.75 | -0.50 | -0.25 | 0 | 0 |
| 102040 | -2.75 | -2.75 | -2.50 | -2.25 | -2.00 | -2.00 | -1.75 | -1.50 | -1.25 | -1.00 | -1.00 | -0.75 | -0.50 | -0.25 | 0 |
| 103448 | -2.75 | -2.75 | -2.50 | -2.25 | -2.00 | -2.00 | -1.75 | -1.50 | -1.25 | -1.00 | -1.00 | -0.75 | -0.50 | -0.25 | 0 |

Fig. 10

REDUCING THE POWER CONSUMPTION OF A BRUSHLESS MOTOR

REFERENCE TO RELATED APPLICATION

This application claims priority of United Kingdom Application No. 1310570.5, filed Jun. 13, 2013, the entire contents of which are incorporated herein by reference.

FIELD OF THE INVENTION

The present invention relates to a method of controlling a brushless motor so as to reduce the overall power consumption.

BACKGROUND OF THE INVENTION

There is a growing need for brushless motors having a lower power consumption.

SUMMARY OF THE INVENTION

The present invention provides a method of controlling a brushless motor, the method comprising measuring a temperature of the motor, adjusting a control value in the event that the measured temperature is lower than a threshold, and exciting a winding of the motor, wherein the control value is used to define an attribute of excitation, and the adjustment to the control value reduces the input power of the motor.

The resistance of the winding depends on, among other things, its temperature. Consequently, at lower temperatures the power losses associated with the winding will be lower. Additionally, for a permanent-magnet motor, the magnetic field strength of the rotor is inversely proportional to the temperature of the magnet. Consequently, for a given rotor speed, the back EMF induced in the winding will be higher at a lower temperature. Accordingly, if all other things are the same (e.g. supply voltage, speed, control value) then the input power of the motor will be higher at a lower temperature. However, this additional input power is superfluous to requirements. The present invention therefore adjusts the control value that is used to define an attribute (e.g. phase or length) of excitation. The control value is adjusted only in the event that the temperature of the motor is lower than a threshold. Moreover, the control value is adjusted in such a way that the input power of the motor is reduced. Consequently, the input power is reduced when operating at lower temperatures and thus the overall power consumption of the motor is reduced. Since the input power would otherwise be higher than required, the reduction in input power may be achieved without adversely affecting the performance of the motor. The threshold temperature may correspond to a steady-state temperature, and the input power of the motor may be reduced until such time as the motor has reached its steady-state temperature. This then ensures that the input power at lower temperatures does not exceed the input power at the steady-state temperature.

If all other things are the same, the input power of the motor will increase as the temperature decreases. Accordingly, the method may comprise adjusting the control value in a manner that depends on the measured temperature such that the input power of the motor is reduced by a larger amount in response to a lower measured temperature. As a result, further reductions in the input power may be made without adversely affecting the performance of the motor.

Adjusting the control value in a manner that depends on the temperature may be achieved by applying a temperature-dependent compensation value to the control value. A larger compensation value may then be applied to the control value in response to a lower temperature such that the reduction in the input power is larger. The temperature-dependent compensation value may be obtained by solving an equation. Alternatively, the method may comprise storing a temperature lookup table that comprises a compensation value for each of a plurality of temperatures, and indexing the temperature lookup table using the measured temperature to select the compensation value. This then has the advantage that a temperature-dependent compensation value may be obtained in a relatively simple manner. In particular, it is not necessary to solve a potentially complex equation. As a result, the hardware used to implement the method may be relatively cheap and simple.

The method may comprise adjusting the control value such that the difference between the input power of the motor at the measured temperature and the input power of the motor at the threshold temperature is smaller when the control value is adjusted. Put another way, the input power of motor at the threshold temperature may be said to be A, the input power of the motor at the measured temperature when the control value is adjusted may be said to be B, and the input power of the motor at the measured temperature when the control value is not adjusted may be said to be C. The method then comprises adjusting the control value such that $|A-B|<|A-C|$. This then has the benefit of reducing the input power of the motor whilst also ensuring the input power at the measured temperature more closely resembles that at the threshold temperature. As a result, the performance of the motor is more consistent.

The input power of motor at the threshold temperature may be said to be A, and the input power of the motor at the measured temperature when the control value is adjusted may be said to be B. The method may then comprise adjusting the control value such that difference between A and B is no more than 1% of A. The control value is therefore adjusted in such a way that the input power of the motor at the measured temperature is substantially the same as that at the threshold temperature. This then has the advantage that the power consumption of the motor is reduced whilst the performance of the motor at the measured temperature is unchanged from that at the threshold temperature.

The method may comprise adjusting the control value in the event that the measured temperature is within a range of temperatures spanning at least 40 deg C. As a result, a more consistent performance may be achieved for the motor over a relatively large range of temperatures. Moreover, where the method comprises adjusting the control value such that the input power of the motor at the measured temperature is substantially the same as that at the threshold temperature, the same performance may be achieved over the temperature range.

The motor may be used to drive an impeller or other means for generating an airflow that cools the motor. The mass flow rate of the airflow may be sensitive to the speed of the motor. As a result, the steady-state temperature of the motor will vary according to the speed of the motor. The method may therefore comprise employing a temperature threshold that depends on the speed of the motor. This then has the benefit that the input power of the motor is reduced only when the temperature of the motor drops below the steady-state temperature.

As the mass flow rate generated by the motor decreases, the load on the motor is likely to decrease and thus the speed of the motor is likely to increase. As a result, the steady-state temperature of the motor increases as the motor speed increases. Accordingly, the method may comprise employing a higher temperature threshold in response to a higher motor speed.

As noted above, the motor may be used to drive an impeller or other means for generating an airflow that cools the motor. The steady-state temperature of the motor may then vary according to the speed of the motor. Should the temperature of the motor then drop below the threshold temperature, the change in the input power of the motor from that normally observed at the steady-state temperature will differ according to the speed of the motor. Accordingly, the method may comprise adjusting the control value by an amount that depends on the speed of the motor. As noted in the preceding paragraph, the steady-state temperature of the motor typically rises in response to an increase in the motor speed. Accordingly, the method may comprise adjusting the control value such that the input power of the motor is reduced by a larger amount in response to a higher motor speed. As a result, further savings in the power consumption of the motor may be made without adversely affecting the performance of the motor. Additionally or alternatively, the input power of the motor at temperatures below the threshold may be made to more closely resemble that at the steady-state temperature. This then has the benefit that the performance of the motor is more consistent.

The method may comprise storing a temperature lookup table that comprises a compensation value for each of a plurality of motor speeds. The method then further comprises measuring the speed of the motor, and indexing the temperature lookup table using the measured motor speed to select the compensation value. This then has the advantage that a speed-dependent compensation value may be obtained in a relatively simple manner and thus the hardware used to implement the method may be relatively cheap and simple.

The control value may be used to define the phase or the length of excitation. More particularly, the method may comprise exciting the winding at times defined by a phase period relative to zero-crossings of back EMF or rising inductance in the winding, and exciting the winding for a conduction period. The control value may then define the phase period or the conduction period.

The method may comprise dividing each half of an electrical cycle of the motor into a conduction period followed by freewheel period, and the control value may define one of a phase and a length of the conduction period.

The motor may comprise a rotor having a permanent magnet, and the measured temperature may be proportional to the temperature of the magnet. As the rotor rotates, the magnet induces a back EMF in the phase winding. The magnetic field strength of a magnet is typically inversely proportional to its temperature. Consequently, for a given rotor speed, the back EMF induced in the winding will be higher at lower temperatures. Accordingly, when operating at temperatures below the threshold, the back EMF and thus the input power of motor will be higher than that at the threshold. By reducing the input power at temperatures below the threshold, the overall power consumption of the motor may be reduced without necessarily affecting the performance of the motor.

The present invention also provides a method of controlling a brushless motor, the method comprising storing a power lookup table, the power lookup table comprising a control value for each of a plurality of voltages or speeds, measuring the magnitude of a supply voltage or the speed of the motor, indexing the power lookup table using the measured voltage or speed to select a control value, measuring a temperature of the motor, applying a compensation value to the selected control value in the event that the measured temperature is lower than a threshold, and exciting a winding of the motor with the supply voltage, wherein the selected control value defines an attribute of excitation, and the compensation value when applied to the selected control value reduces the input power of the motor.

The power lookup table stores control values that achieve a particular input power at each voltage and/or speed point when the motor operates at the threshold temperature. As explained above, the input power of the motor increases at the temperature of the motor decreases. Consequently, should the temperature drop below the threshold, the input power of the motor will be higher than that intended by the power map. The control value is therefore adjusted should the temperature of the motor drop below the threshold. Moreover, the control value is adjusted such that the input power of the motor is reduced. As a result, the overall power consumption of the motor is reduced. The reduction in the input power may be achieved without adversely affecting the performance of the motor. In particular, the input power may be reduced by an amount such that the input power of the motor at temperatures below the threshold correspond roughly to the input power of the motor at the threshold.

The present invention also provides a method of controlling a brushless motor, the method comprising storing a power lookup table, the power lookup table comprising a control value for each of a plurality of voltages or speeds, storing a temperature lookup table, the temperature lookup table comprising a compensation value for each of a plurality of temperatures, measuring the magnitude of a supply voltage or the speed of the motor, measuring a temperature of the motor, indexing the power lookup table using the measured voltage or speed to select a control value, indexing the temperature lookup table using the measured temperature to select a compensation value, applying the selected compensation value to the selected control value to obtain a temperature-compensated control value, and exciting a winding of the motor with the supply voltage, wherein the temperature-compensated control value is used to define an attribute of excitation.

The power lookup table stores control values that achieve a particular input power at each voltage and/or speed point when the motor operates at a particular temperature. As explained above, the input power of the motor may depend on the temperature of the motor. The temperature lookup table therefore stores compensation values for adjusting the control value selected from the power lookup table. As a result, better control may be achieved over the input power of the motor over a range of different temperatures. In particular, the temperature lookup table may store compensation values that ensure that the input power of the motor at a particular voltage and/or speed point is substantially the same across a range of different temperatures. This then has the advantage that the performance of the motor is unchanged over the temperature range.

The present invention further provides a control circuit configured to perform a method as described in any one of the preceding paragraphs, as well as a motor assembly comprising a brushless motor and the control circuit.

The control circuit may comprise a temperature sensor for measuring a temperature of the motor, an inverter for coupling to a winding of the motor, a gate driver module and a controller. The gate driver module then controls switches of the inverter in response to control signals received from the controller. The controller monitors a temperature signal output by the temperature sensor, generates control signals to excite the winding, and adjusts the control signals so as to reduce the input power of the motor in the event that the measured temperature of the motor is lower than a threshold.

The present invention also provides a compressor comprising an impeller and a motor assembly as described in the preceding paragraph, wherein the impeller is driven by the motor assembly and generates an airflow that cools the motor assembly.

BRIEF DESCRIPTION OF THE DRAWINGS

In order that the present invention may be more readily understood, an embodiment of the invention will now be described, by way of example, with reference to the accompanying drawings, in which:

FIG. 10 details a temperature lookup table employed by the controller of the motor assembly.

DETAILED DESCRIPTION OF THE INVENTION

Figure 1:
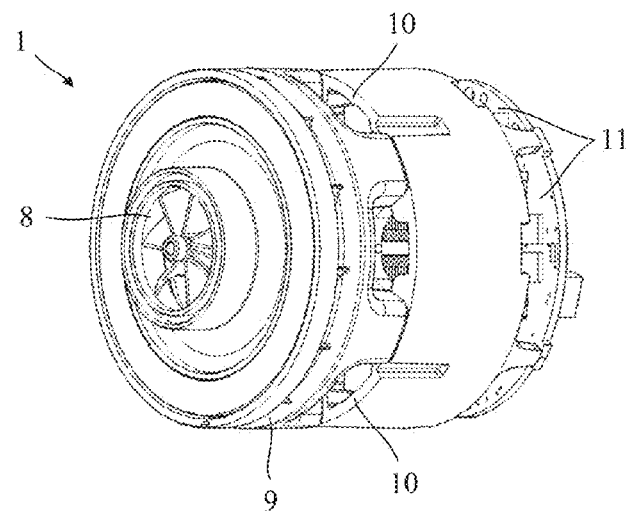
FIG. 1 is an axonometric view of a compressor in accordance with the present invention.
Figure 2:
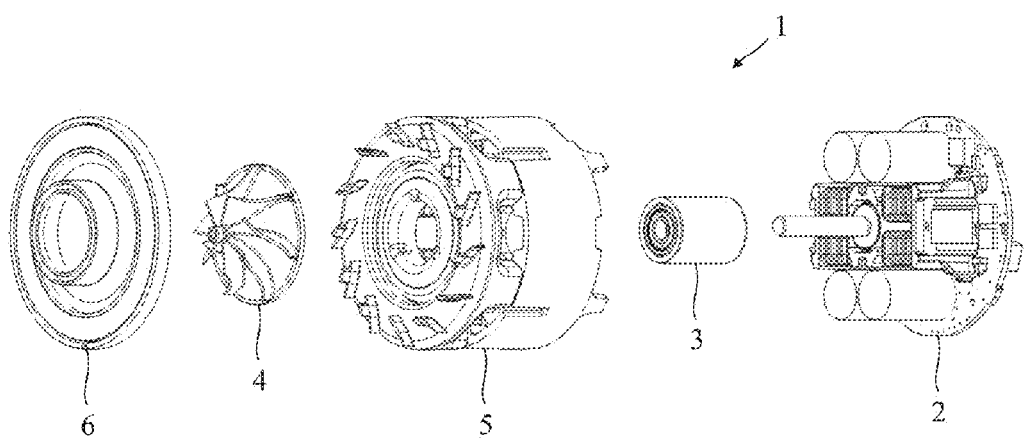
FIG. 2 is an exploded view of the compressor.
Figures 3, 6:
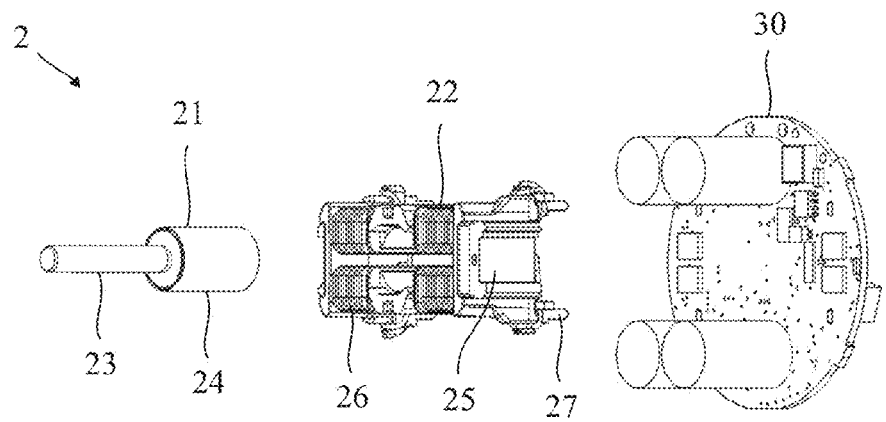
FIG. 3 is an exploded view of the motor assembly of the compressor.
FIG. 6 details the allowed states of the inverter in response to control signals issued by the controller of the motor assembly.

The compressor 1 of FIGS. 1 to 3 comprises a motor assembly 2, a bearing assembly 3, an impeller 4, a frame 5 and a shroud 6.

The motor assembly 2 comprises a brushless motor 20 and a control circuit 30 for controlling the motor 20. The motor 20 comprises a rotor 21 that rotates relative to a stator 22. The rotor 21 comprises a shaft 23 to which a four-pole permanent magnet 24 is attached. The stator 22 comprises a pair of c-shaped stator cores 25 that together define four poles arranged around the magnet 22. Conductive wires 26 wound about the stator cores 25 are connected to the control circuit 30 via terminal connectors 27, which also act to secure the control circuit 30 to the motor 20. The wires 26 are connected in series or in parallel so as to form a single phase winding 26.

The motor assembly 2 is secured within the frame 5 by the bearing assembly 3. More specifically, the bearing assembly 3 is secured to the frame 5 and to the shaft 23 of the rotor 21. The impeller 4 is then secured to the free end of the shaft 23.

The shroud 6 overlies the impeller 4 and the frame 5. The shroud 6 and the frame 5 extend radially beyond the impeller 4 and define a diffuser 7 that surrounds the impeller 4.

The compressor 3 comprises a first inlet 8, a first outlet 9, a second inlet 10, and a second outlet 11. The first inlet 8 corresponds to the eye or inlet of the shroud 6. The first outlet 9 may be regarded as the outlet of the diffuser 7 and comprises an annular aperture defined by the axial gap that exists between the frame 5 and the shroud 6 at the periphery. The second inlet 10 comprises a plurality of apertures that are formed around the frame 5. The second outlet 11 likewise comprises a plurality of apertures that are defined between the end of the frame 5 and the control circuit 30.

The motor assembly 2 is intended to be powered by a DC power supply 15. During operation, the motor assembly 2 drives the impeller 4 causing an airflow to be drawn through the compressor 1. When the compressor 1 is installed in a product (not shown), the airflow enters the compressor 3 via the first inlet 8. The airflow is then centrifuged outwards by the impeller 4, flows through the diffuser 7 and exits the compressor 1 via the first outlet 9. On exiting the compressor 1, the airflow is redirected back into the compressor 1 via the second inlet 10. The airflow then passes through the interior of the compressor 1 and exits the compressor 1 via the second outlet 11. As the airflow flows between the second inlet 10 and the second outlet 11, the airflow cools the motor assembly 2.

Figure 4:
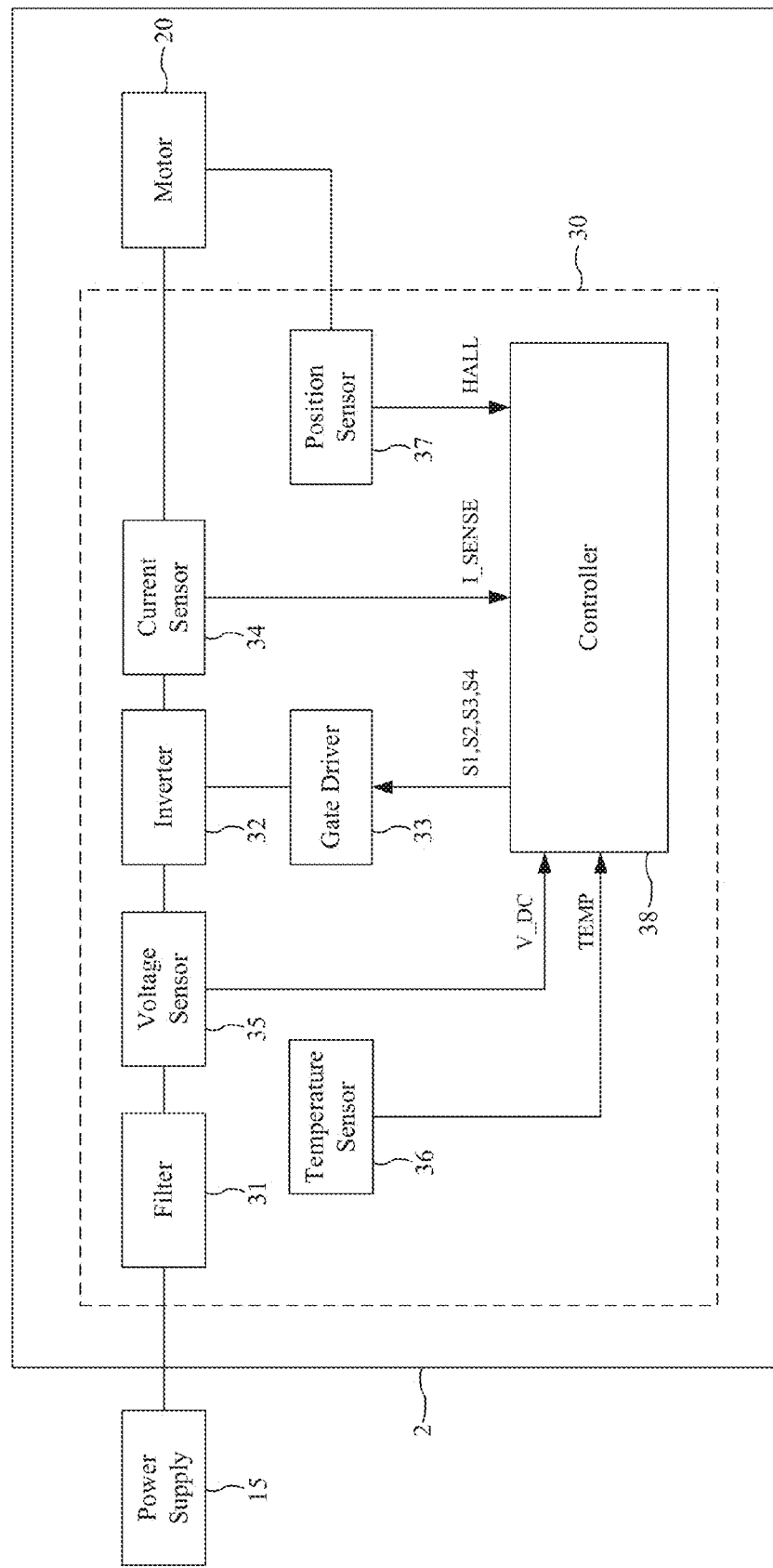
FIG. 4 is a block diagram of the motor assembly.
Figure 5:
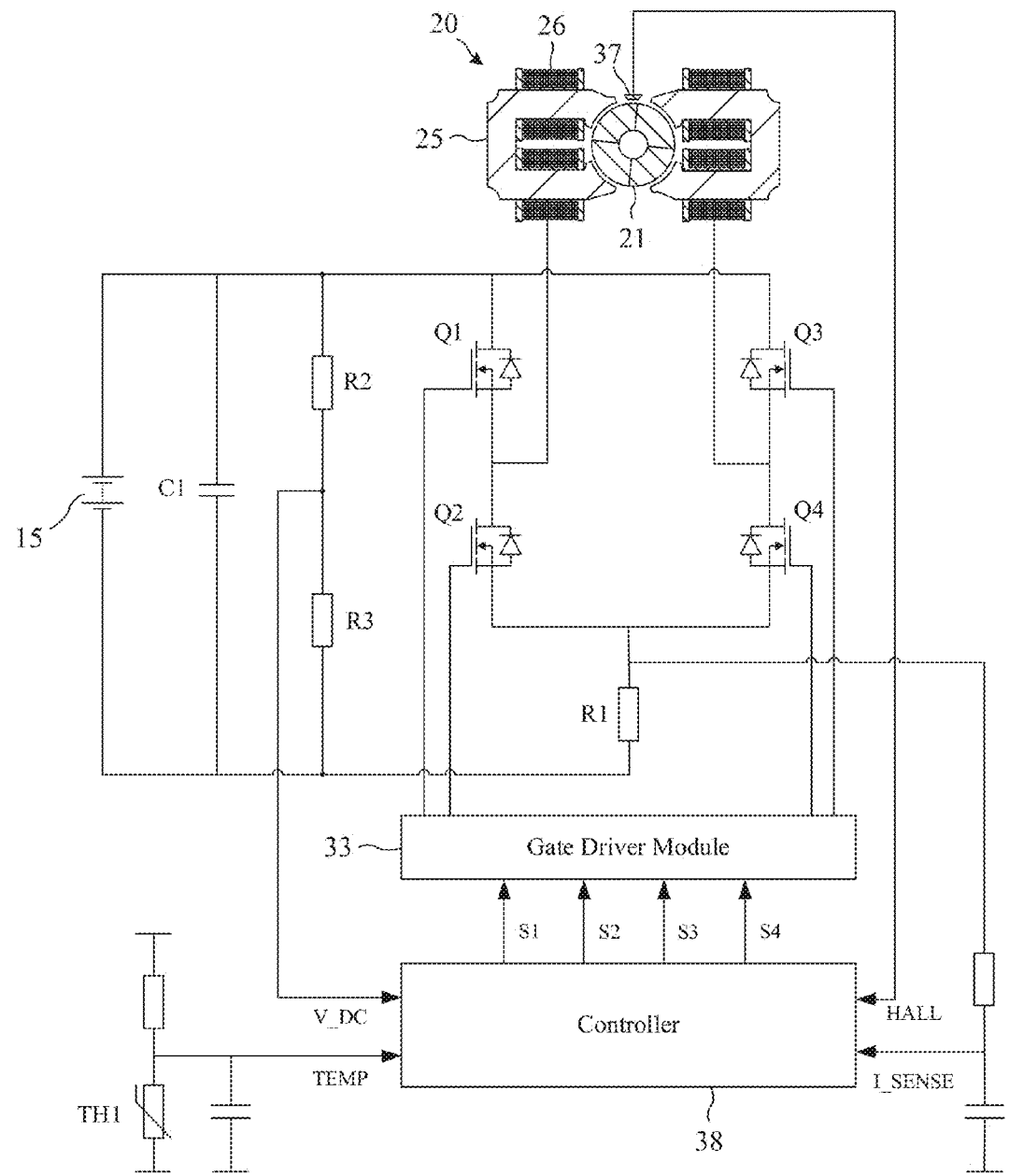
FIG. 5 is a schematic diagram of the motor assembly.

Referring now to FIGS. 4 and 5, the control circuit 30 comprises a filter 31, an inverter 32, a gate driver module 33, a current sensor 34, a voltage sensor 35, a temperature sensor 36, a position sensor 37, and a controller 38.

The filter 31 comprises a link capacitor C1 that smoothes the relatively high-frequency ripple that arises from switching of the inverter 32.

The inverter 32 comprises a full bridge of four power switches Q1-Q4 that couple the phase winding 26 to the voltage rails. Each of the switches Q1-Q4 includes a freewheel diode.

The gate driver module 33 drives the opening and closing of the switches Q1-Q4 in response to control signals received from the controller 38.

The current sensor 34 comprises a shunt resistor R1 located between the inverter 32 and the zero-volt rail. The voltage across the current sensor 34 provides a measure of the current in the phase winding 26 when connected to the power supply 15. The voltage across the current sensor 34 is output to the controller 38 as signal I_PHASE.

The voltage sensor 35 comprises a potential divider R2,R3 located between the DC voltage rail and the zero volt rail. The voltage sensor outputs signal V_DC to the controller 38, which represents a scaled-down measure of the supply voltage provided by the power supply 15.

The temperature sensor 36 comprises a thermistor TH1. The voltage across the thermistor TH1 is output to the controller 38 as signal TEMP.

The position sensor 37 comprises a Hall-effect sensor located in a slot opening of the stator 22. The sensor 37 outputs a digital signal, HALL, that is logically high or low depending on the direction of magnetic flux through the sensor 37. The HALL signal therefore provides a measure of the angular position of the rotor 21.

The controller 38 comprises a microcontroller having a processor, a memory device, and a plurality of peripherals (e.g. ADC, comparators, timers etc.). The memory device stores instructions for execution by the processor, as well as control parameters and lookup tables that are employed by the processor during operation. The controller 38 is responsible for controlling the operation of the motor 20 and generates four control signals S1-S4 for controlling each of the four power switches Q1-Q4. The control signals are output to the gate driver module 33, which in response drives the opening and closing of the switches Q1-Q4.

FIG. 6 summarises the allowed states of the switches Q1-Q4 in response to the control signals S1-S4 output by the controller 38. Hereafter, the terms 'set' and 'clear' will be used to indicate that a signal has been pulled logically high and low respectively. As can be seen from FIG. 6, the controller 38 sets S1 and S4, and clears S2 and S3 in order to excite the phase winding 26 from left to right. Conversely, the controller 38 sets S2 and S3, and clears S1 and S4 in order to excite the phase winding 26 from right to left. The controller 38 clears S1 and S3, and sets S2 and S4 in order to freewheel the phase winding 26. Freewheeling enables current in phase the winding 26 to re-circulate around the low-side loop of the inverter 32. In the present embodiment, the power switches Q1-Q4 are capable of conducting in both directions. Accordingly, the controller 38 closes both low-side switches Q2,Q4 during freewheeling such that current flows through the switches Q2,Q4 rather than the less efficient diodes. Conceivably, the inverter 32 may comprise power switches that conduct in a single direction only. In this instance, the controller 38 would clear S1, S2 and S3, and set S4 so as to freewheel the phase winding 26 from left to right. The controller 38 would then clear S1, S3 and S4, and set S2 in order to freewheel the phase winding 26 from right to left. Current in the low-side loop of the inverter 32 then flows down through the closed low-side switch (e.g. Q4) and up through the diode of the open low-side switch (e.g. Q2).

The controller 38 operates in one of two modes depending on the speed of the rotor 21. At speeds below a predefined threshold, the controller 38 operates in acceleration mode. At speeds at or above the threshold, the controller 38 operates in steady-state mode. The speed of the rotor 21 is determined from the interval, T_HALL, between two successive edges of the HALL signal. This interval will hereafter be referred to as the HALL period.

In each mode the controller 38 commutates the phase winding 26 in response to edges of the HALL signal. Each HALL edge corresponds to a change in the polarity of the magnet 24, and thus a change in the polarity of the back EMF induced in the phase winding 26. More particularly, each HALL edge corresponds to a zero-crossing in the back EMF. Commutation involves reversing the direction of current through the phase winding 26. Consequently, if current is flowing through the phase winding 26 in a direction from left to right, commutation involves exiting the winding from right to left.

Acceleration Mode

When operating in acceleration mode, the controller 38 commutates the phase winding 26 in synchrony with the edges of the HALL signal. Over each electrical half-cycle, the controller 38 sequentially excites and freewheels the phase winding 26. More particularly, the controller 38 excites the phase winding 26, monitors the current signal, I_PHASE, and freewheels the phase winding 26 when the current in the phase winding 26 exceeds a predefined limit Freewheeling then continues for a predefined freewheel period during which time current in the phase winding 26 falls to a level below the current limit. At the end of the freewheel period the controller 38 again excites the phase winding 26. This process of exciting and freewheeling the phase winding 26 continues over the full length of the electrical half-cycle. The controller 38 therefore switches from excitation to freewheeling multiple times during each electrical half-cycle.

Figure 7:
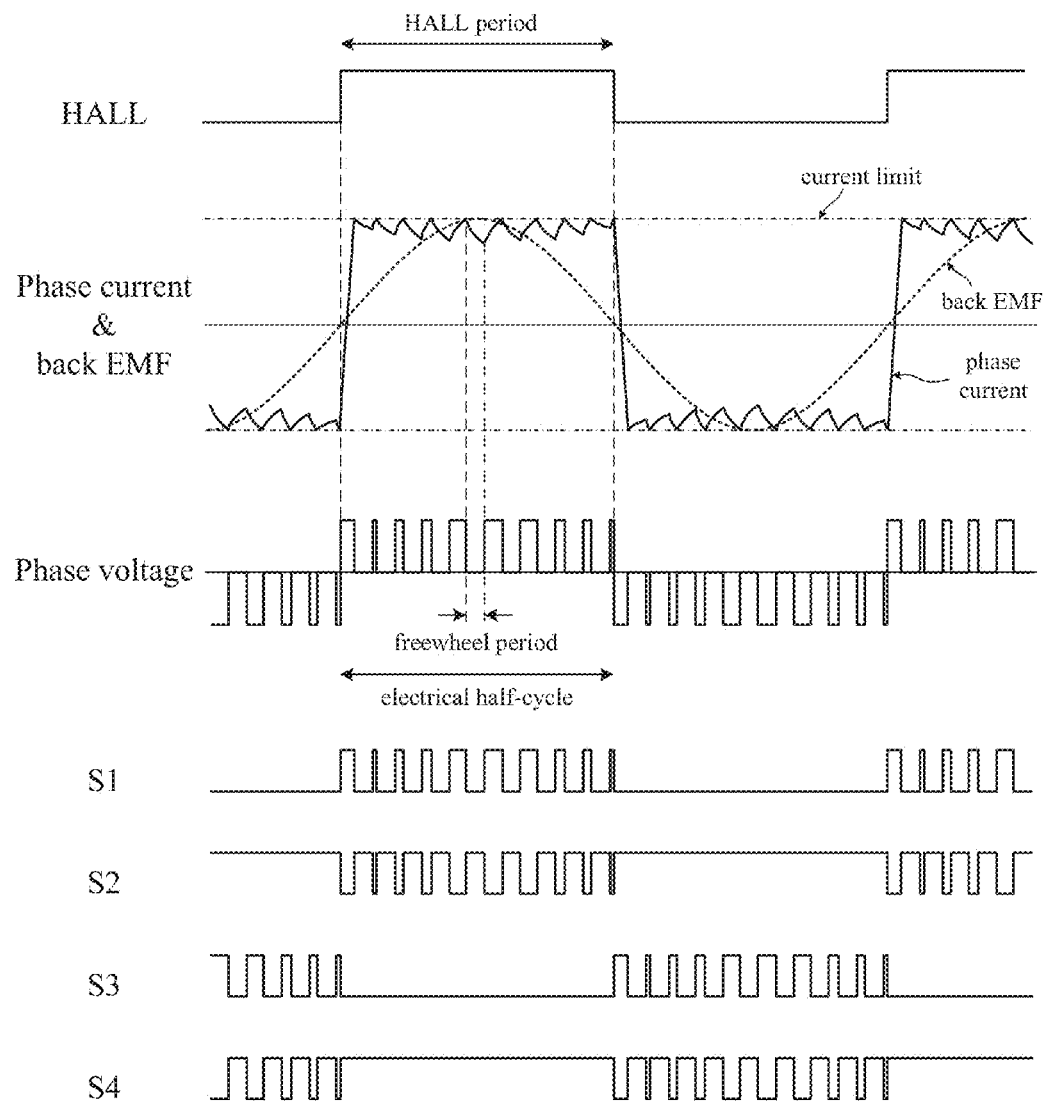
FIG. 7 illustrates various waveforms of the motor assembly when operating in acceleration mode.

FIG. 7 illustrates the waveforms of the HALL signal, the back EMF, the phase current, the phase voltage, and the control signals over a couple of HALL periods when operating in acceleration mode.

At relatively low speeds, the magnitude of the back EMF induced in the phase winding 26 is relatively small. Current in the phase winding 26 therefore rises relatively quickly during excitation, and falls relatively slowly during freewheeling. Additionally, the length of each HALL period and thus the length of each electrical half-cycle is relatively long. Consequently, the frequency at which the controller 38 switches from excitation to freewheeling is relatively high. However, as the rotor speed increases, the magnitude of the back EMF increases and thus current rises at a slower rate during excitation and falls at a quicker rate during freewheeling. Additionally, the length of each electrical half-cycle decreases. As a result, the frequency of switching decreases.

Steady-State Mode

When operating in steady-state mode, the controller 38 may advance, synchronise or retard commutation relative to each HALL edge. In order to commutate the phase winding 26 relative to a particular HALL edge, the controller 38 acts in response to the preceding HALL edge. In response to the preceding HALL edge, the controller 38 subtracts a phase period, T_PHASE, from the HALL period, T_HALL, in order to obtain a commutation period, T_COM:

$$T\_COM = T\_HALL - T\_PHASE$$

The controller 38 then commutates the phase winding 26 at a time, T_COM, after the preceding HALL edge. As a result, the controller 38 commutates the phase winding 26 relative to the subsequent HALL edge by the phase period, T_PHASE. If the phase period is positive, commutation occurs before the HALL edge (advanced commutation). If the phase period is zero, commutation occurs at the HALL edge (synchronous commutation). And if the phase period is negative, commutation occurs after the HALL edge (retarded commutation).

Advanced commutation is employed at higher rotor speeds, whilst retarded commutation is employed at lower rotor speeds. As the speed of the rotor 21 increases, the HALL period decreases and thus the time constant (L/R) associated with the phase inductance becomes increasingly important. Additionally, the back EMF induced in the phase winding 26 increases, which in turn influences the rate at which phase current rises. It therefore becomes increasingly difficult to drive current and thus power into the phase winding 26. By commutating the phase winding 26 in advance of a HALL edge, and thus in advance of a zero-crossing in back EMF, the supply voltage is boosted by the back EMF. As a result, the direction of current through the phase winding 26 is more quickly reversed. Additionally, the phase current is caused to lead the back EMF, which helps to compensate for the slower rate of current rise. Although this then generates a short period of negative torque, this is normally more than compensated by the subsequent gain in positive torque. When operating at lower speeds, it is not necessary to advance commutation in order to drive the required current into the phase winding 26. Moreover, optimum efficiency is typically achieved by retarding commutation.

When operating in steady-state mode, the controller 38 divides each electrical half-cycle into a conduction period followed by a freewheel period. The controller 38 then excites the phase winding 26 during the conduction period and freewheels the phase winding 26 during the freewheel period. When operating within steady-state mode, the phase current is not expected to exceed the current limit during excitation. Consequently, the controller 38 switches from excitation to freewheeling only once during each electrical half-cycle.

The controller 38 excites the phase winding 26 for a conduction period, T_CD. At the end of the conduction period, the controller 38 freewheels the phase winding 26. Freewheeling then continues indefinitely until such time as the controller 38 commutates the phase winding 26. The controller 38 therefore controls excitation of the phase winding 26 using two parameters: the phase period, T_PHASE, and the conduction period, T_CD. The phase period defines the phase of excitation (i.e. the electrical period or angle at which the phase winding 26 is excited relative to zero-crossings in the back EMF) and the conduction period defines the length of excitation (i.e. the electrical period or angle over which the phase winding 26 is excited).

Figure 8:
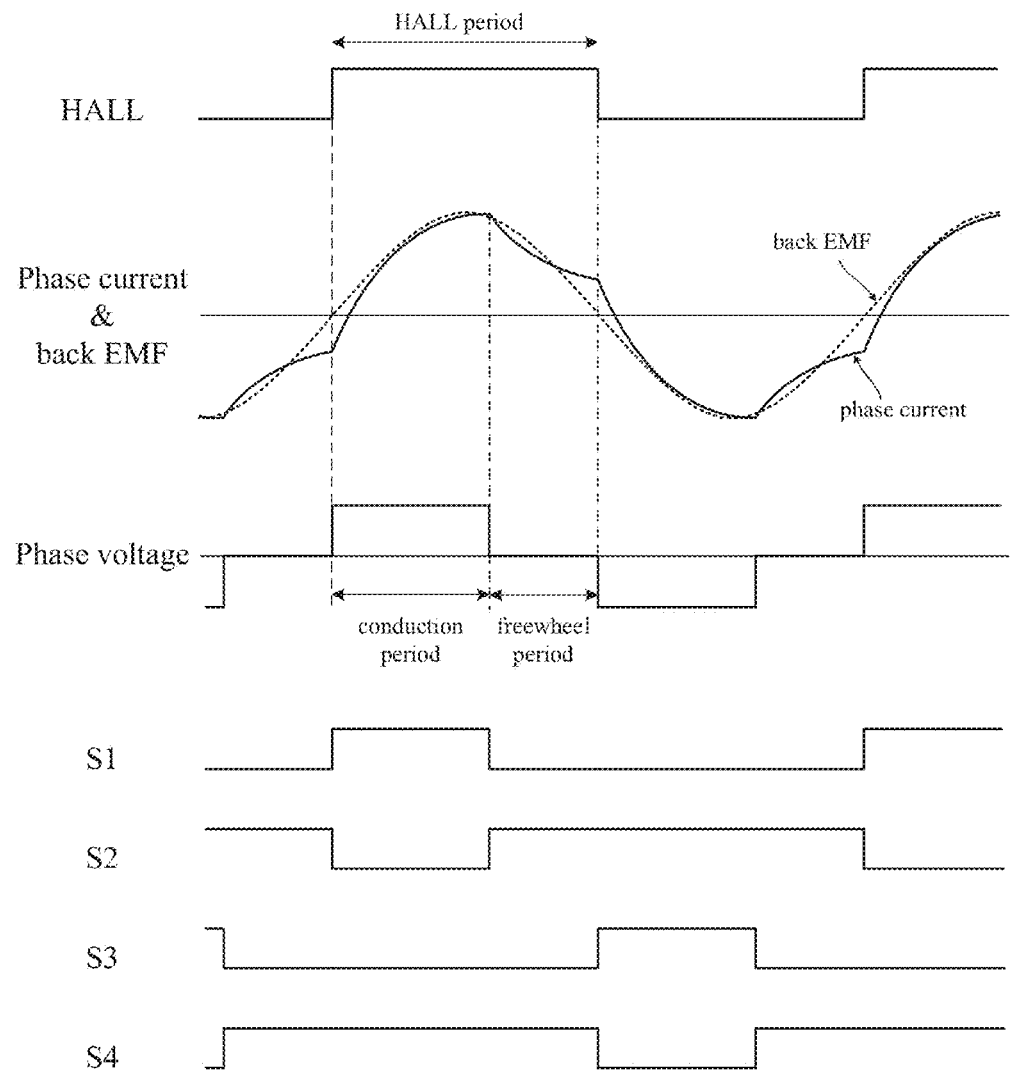
FIG. 8 illustrates various waveforms of the motor assembly when operating in steady-state mode.

FIG. 8 illustrates the waveforms of the HALL signal, the back EMF, the phase current, the phase voltage, and the control signals over a couple of HALL periods when operating in steady-state mode. In FIG. 8 the phase winding 26 is commutated in synchrony with the HALL edges.

The magnitude of the supply voltage used to excite the phase winding 26 may vary. For example, the power supply 15 may comprise a battery that discharges with use. Alternatively, the power supply 15 may comprise an AC source, rectifier and smoothing capacitor that provide a relatively smooth voltage, but the RMS voltage of the AC source may vary. Changes in the magnitude of the supply voltage will influence the amount of current that is driven into the phase winding 26 during the conduction period. As a result, the power of the motor 20 is sensitive to changes in the supply voltage. In addition to the supply voltage, the power of the motor 20 is sensitive to changes in the speed of the rotor 21. As the speed of the rotor 21 varies (e.g. in response to changes in load), so too does the magnitude of the back EMF induced in the phase winding 26 by the magnet 24. Consequently, the amount of current driven into the phase winding 26 during the conduction period may vary. The controller 38 therefore varies the phase period and the conduction period in response to changes in the magnitude of the supply voltage. The controller 38 also varies the phase period in response to changes in the speed of the rotor 21.

The controller 38 stores a voltage lookup table that comprises a phase period, T_PHASE, and a conduction period, T_CD, for each of a plurality of different supply voltages. The controller 38 also stores a speed lookup table that comprises a speed-compensation value for each of a plurality of different rotor speeds and different supply voltages. The lookup tables store values that achieve a particular input power at each voltage and speed point.

The V_DC signal output by the voltage sensor 35 provides a measure of the supply voltage, whilst the length of the HALL period provides a measure of the rotor speed. The controller 38 indexes the voltage lookup table using the supply voltage to select a phase period and a conduction period. The controller 38 then indexes the speed lookup table using the rotor speed and the supply voltage to select a speed-compensation value. The controller 38 then adds the selected speed-compensation value to the selected phase period so as to obtain a speed-compensated phase period. The commutation period, T_COM, is then obtained by subtracting the speed-compensated phase period from the HALL period, T_HALL.

The speed lookup table stores speed-compensation values that depend not only on the speed of the rotor 21 but also on the magnitude of the supply voltage. The reason for this is that, as the supply voltage decreases, a particular speed-compensation value has a smaller net effect on the input power of the motor 20. By storing speed-compensation values that depend on both the rotor speed and the supply voltage, better control over the input power of the motor 20 may be achieved in response to changes in the rotor speed.

It will be noted that two lookup tables are used to determine the phase period, T_PHASE. The first lookup table (i.e. the voltage lookup table) is indexed using the supply voltage. The second lookup table (i.e. the speed lookup table) is indexed using both the rotor speed and the supply voltage. Since the second lookup table is indexed using both the rotor speed and the supply voltage, one might question the need for two lookup tables. However, the advantage of using two lookup tables is that different voltage resolutions may be used. The input power of the motor 20 is relatively sensitive to the magnitude of the supply voltage. In contrast, the effect that the speed-compensation value has on the input power is less sensitive to the supply voltage. Accordingly, by employing two lookup tables, a finer voltage resolution may be used for the voltage lookup table, and a coarser voltage resolution may be used for the speed lookup table. As a result, relatively good control over the input power of the motor 20 may be achieved through the use of smaller lookup tables, which then reduces the memory requirements of the controller 38.

Power Conservation

Figure 9:
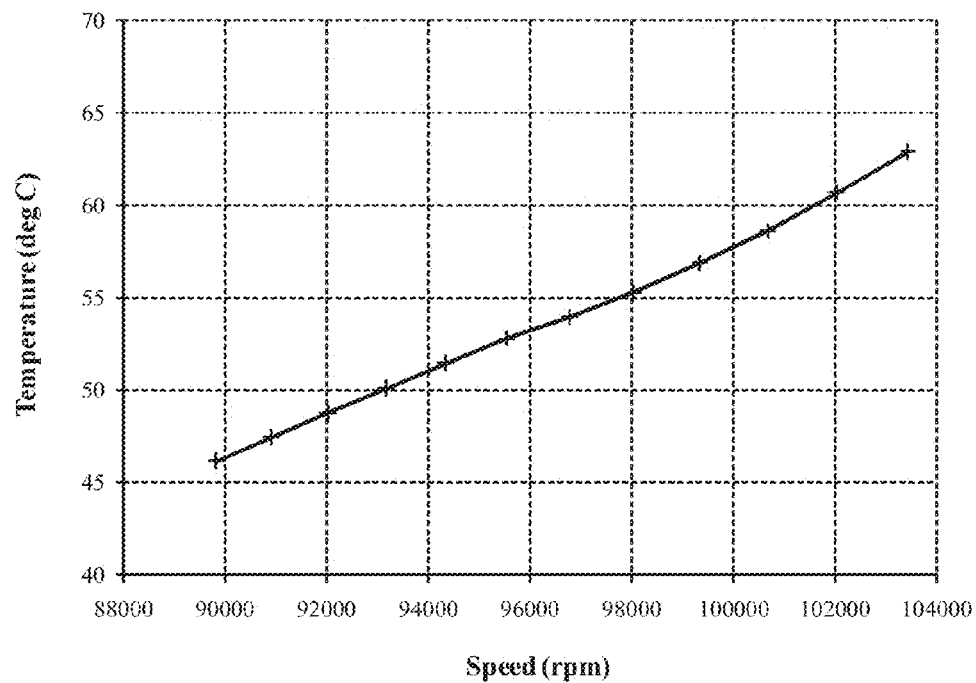
FIG. 9 illustrates the steady-state temperature of the motor assembly at different speeds when the ambient air temperature is 23 deg C.

During operation of the compressor 1, the motor assembly 2 generates heat due to power losses (e.g. copper losses, iron losses, switch losses). The motor assembly 2 is then cooled by the airflow generated by the impeller 4. The motor assembly 2 therefore has a steady-state temperature that depends on the speed of the impeller 4 (and thus the speed of the rotor 21) as well as the temperature of the ambient air drawn into the compressor 1 by the impeller 4. FIG. 9 illustrates the steady-state temperature of the motor assembly 2 at various rotor speeds when the ambient air temperature is 23 deg C. It can be seen from FIG. 9 that the steady-state temperature of the motor assembly 2 increases as the rotor speed increases. This behaviour may seem counterintuitive, particularly as the rotor 21 is driving an impeller 4 that generates a cooling airflow.

However, the higher rotor speed arises when the load on the rotor 21 is smaller, which occurs when the impeller 4 is drawing in less air. Accordingly, the steady-state temperature increases in response to an increase in the rotor speed.

The voltage and speed lookup tables comprise values that achieve a particular input power at each voltage and speed point when operating at the steady-state temperatures detailed in FIG. 9. However, it is possible that the temperature of the motor assembly 2 may be lower than the steady-state temperature. For example, if the compressor 1 has not been used for a while then the motor assembly 2 may initially be at ambient temperature. It will then take some time for the motor assembly 2 to warm to the steady-state temperature. Alternatively, the temperature of the ambient air drawn into the compressor 1 by the impeller 4 may be lower than 23 deg C. and thus the airflow used to cool the motor assembly 2 will be at a lower temperature. As will now be explained, if the temperature of the motor assembly 2 is lower than the steady-state temperature detailed in FIG. 9, the input power of the motor 2 will be higher.

The magnetic field strength or magnetic flux density of the rotor magnet 24 is inversely proportional to the temperature of the magnet 24. Consequently, for a given rotor speed, the back EMF induced in the phase winding 26 will be higher at a lower temperature. Accordingly, if all other things are the same (e.g. the supply voltage, the rotor speed, the phase period and the conduction period) then the input power of the motor 20 will be higher when operating at temperatures below the steady-state temperature. However, this additional input power is superfluous to requirements. Accordingly, the controller 38 employs a method that reduces the input power of the motor 20 when operating at temperatures below the steady-state temperature so as reduce the overall power consumption of the motor 20.

In addition to the voltage and speed lookup tables, the controller 38 stores a temperature lookup table. The temperature lookup table comprises a compensation value for each of a plurality of temperatures and a plurality of rotor speeds. When operating in steady-state mode, the controller 38 periodically monitors (e.g. during each or every nth HALL period) the temperature of the motor assembly 2 via the TEMP signal. The TEMP signal is generated by the thermistor TH1 forming part of the control circuit 30. Owing to the location of the thermistor, there is a difference between the temperature measured by the thermistor and the actual temperature of the magnet 24. Nevertheless, there is a well-understood correlation between the two temperatures and thus the TEMP signal provides a measure of the temperature of the magnet 24. The controller 38 then indexes the temperature lookup table using the measured temperature and the rotor speed to select a temperature-compensation value. The controller 38 then adds the selected temperature-compensation value to the speed-compensated phase period. The net result is a phase period that is compensated for both speed and for temperature.

FIG. 10 illustrates the temperature lookup table employed by the controller 38. The unit for each temperature-compensation value is μs. The shaded cells represent the steady-state temperature for each of the different speed points. As can be seen from FIG. 10, each temperature-compensation value acts to reduce the phase period when operating at temperatures below the steady-state temperature. As a result, less current and thus power is driven into the phase winding 26 during the conduction period. As a result, the increase in the input power that arises from the lower temperature is offset by the decrease in the input power that arises from the reduction in the phase period. As a result, the overall power consumption of the motor 20 is reduced without adversely affecting the performance of the motor 20.

The temperature lookup table stores compensation values that increase in magnitude as the temperature decreases. Consequently, a larger compensation value is applied to the phase period in response to a lower temperature, and thus the reduction in the input power of the motor 20 is larger. The input power of the motor 20 is therefore reduced by an amount that is commensurate with the measured temperature. As a result, further savings may be made in the overall power consumption of the motor 20 without adversely affecting the performance of the motor 20.

In the present embodiment, each compensation value leads to a reduction in the input power that ensures that the input power at the measured temperature is substantially the same as that at the steady-state temperature. As a result, the input power of the motor 20 is substantially constant over the range of temperatures covered by the temperature lookup table.

Figure 11:
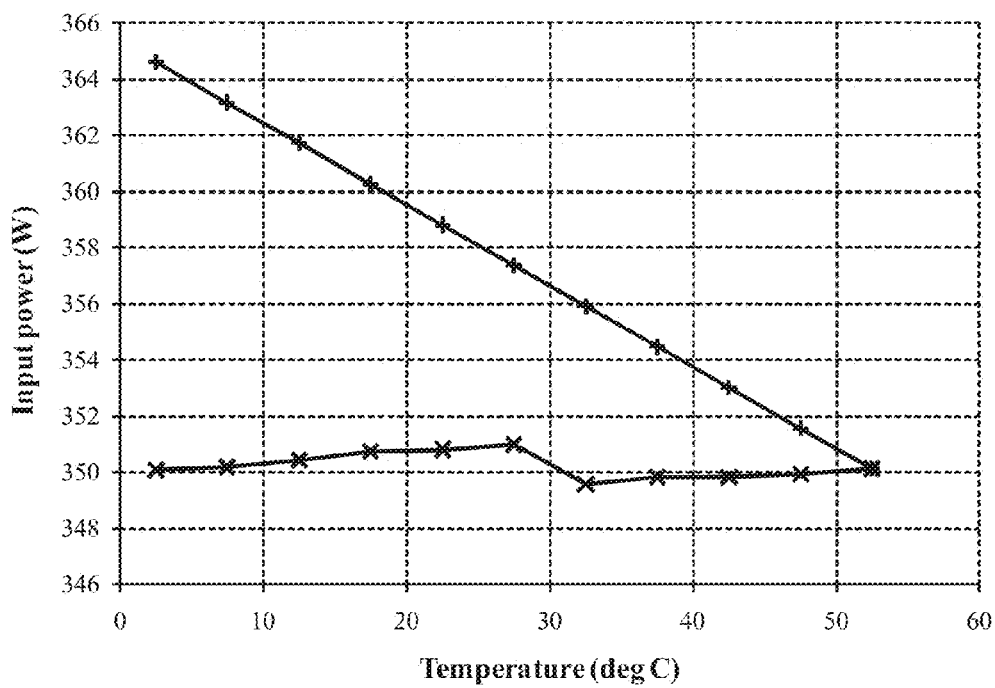
FIG. 11 illustrates the input power of the motor assembly at different temperatures without temperature compensation (linear curve) and with temperature compensation (non-linear curve).

FIG. 11 illustrates the input power of the motor 20 over a range of temperatures when operating at 100 krpm. At 100 krpm, the steady-state temperature of the motor assembly 2, as measured by the thermistor TH1, is nominally 54 deg C., and the input power of the motor is 350 W. Two curves are shown in FIG. 11. The first curve illustrates the behaviour of the input power when temperature compensation is applied, and the second curve illustrates the behaviour of the input power when temperature compensation is not applied. It can be seen that, when temperature compensation is applied, the input power of the motor 20 is kept within +/−1.5 W of the input power at the steady-state temperature. The range in the input power over the full temperature range from 0 to 54 deg C. is therefore less than 1% of the input power at the steady-state temperature. Contrast this with the situation in which no temperature compensation is applied. In this instance, the input power of the motor assembly varies from 350 W at the steady-state temperature to 364.5 W at 0 deg C. This then corresponds to a range of 14.5 W, which is over to 4% of the input power at the steady-state temperature.

The temperature lookup table stores compensation values that result in substantially constant input power over a range of temperatures. This then has the advantage that the overall power consumption is reduced whilst the performance of the motor 20 over the temperature range is unchanged. The temperature lookup table detailed in FIG. 10 stores compensation values that span at least 40 deg C. at each speed point. This represents a relatively large range of temperatures over which constant input power is achieved. In spite of the aforementioned advantage, it may be sufficient simply to reduce the input power of the motor 20 until such time as the motor assembly 2 has reached the steady-state temperature, irrespective of whether constant input power is achieved. Alternatively, perhaps the only requirement is that the input power at lower temperatures does not exceed the input power at the steady-state temperature. As a further alternative, the only requirement may be that the difference between the input power at lower temperatures and the input power at the steady-state temperature is smaller when compensation is applied. In other words, if the input power of motor is A when operating at the steady-state temperature, B when operating at a lower temperature and compensation is applied, and C when operating at the lower temperature and compensation is not applied, then the compensation value ensures that |A−B|<|A−C|. This then has the benefit of reducing the input power of the motor assembly whilst also ensuring the input power at lower temperatures more closely resembles that at the steady-state temperature.

As noted above, the steady-state temperature of the motor assembly 2 depends on the speed of the rotor 21. It is for this reason that the temperature lookup table stores compensation values for different temperatures and rotor speeds. Without indexing the lookup table for rotor speed in addition to temperature, it would be impossible to know if the measured temperature is lower than the steady-state temperature and thus whether a compensation value should be applied to the phase period. The dependence of the steady-state temperature with rotor speed arises because the rotor 21 drives an impeller 4 that generates an airflow that cools the motor assembly 2. However, the motor assembly 2 may be employed in situations for which the steady-state temperature does not depend on the rotor speed. For example, the motor assembly 2 may continue to drive an impeller, but the airflow generated by the impeller is not used to cool the motor assembly 2. In this instance, since the motor assembly 2 would have a single steady-state temperature, the temperature lookup table would store compensation values for different temperatures only.

It will be apparent from the temperature lookup table of FIG. 10 that no temperature compensation is applied should the temperature of the motor assembly 2 exceed the steady-state temperature. If the temperature exceeds the steady-state temperature, the input power of the motor 20 will be lower. This is not perceived as a problem since the primary concern, at least in the present embodiment, is that the input power at lower temperatures is reduced such that the overall power consumption of the motor 20 is reduced. Indeed, since the input power of the motor 20 will be lower at temperatures greater than the steady-state temperature, the overall power consumption of the motor 20 will be further reduced. Nevertheless, it may be desirable to ensure that substantially constant input power is achieved not only at temperatures below the steady-state temperature but also at temperatures above the steady-state temperature. Accordingly, the temperature lookup table may additionally store compensation values for temperatures in excess of the steady-state temperature. Rather than reducing the length of the phase period, these additional compensation values would increase the length of the phase period such that the input power of the motor 20 is increased.

The controller 38 varies only the phase period, T_PHASE, in response to changes in the rotor speed and the temperature of the motor assembly 2. Of the two periods (i.e. phase and conduction), the input power of the motor 20 is typically more sensitive to changes in the phase period. Accordingly, better control over the input power of the motor 20 may be achieved by varying the phase period. Nevertheless, in spite of these advantages, the controller 38 could instead vary only the conduction period, T_CD, in response to changes in the rotor speed and the temperature. This may be desirable, for example, if synchronous commutation is employed throughout steady-state mode. Alternatively, the controller 38 may vary both the phase period and the conduction period in response to changes in the rotor speed and/or the temperature of the motor assembly 2. This may be necessary if, for example, the input power of the motor 20 cannot be controlled adequately by varying just the phase period. Or perhaps varying the phase period and the conduction period is desirable in order to improve the efficiency of the motor 20. However, a disadvantage of varying both the phase period and the conduction period is that additional lookup tables are required, thus placing additional demands on the memory of the controller 38.

In the embodiment described above, the controller 38 varies the phase period and the conduction period in response to changes in the supply voltage. This then has the advantage that the efficiency of the motor 20 may be better optimised at each voltage point. Nevertheless, it may be possible to achieve the desired control over the input power of the motor 20 by varying just one of the phase period and the conduction period. Since the input power of the motor 20 is more sensitive to changes in the phase period, better control over the input power may be achieved by varying the phase period. Nevertheless, there may be instances for which it is desirable to vary just the conduction period. For example, the controller 38 might employ synchronous commutation throughout steady-state mode.

The controller 38 may therefore be said to vary the phase period and/or the conduction period in response to changes in the supply voltage and the rotor speed. Whilst the two periods may be varied in response to changes in the supply voltage and the rotor speed, the controller 38 could conceivably vary the periods in response to only one of the supply voltage and the rotor speed. For example, the voltage provided by the power supply 15 may be relatively stable. In the instance, the controller 38 might vary the phase period and/or the conduction period in response to changes in the rotor speed only. Alternatively the motor 20 may be required to operate at constant speed or over a relatively small range of speeds within steady-state mode. In this instance, the controller 38 might vary the phase period and/or the conduction period in response to changes in the supply voltage only. Accordingly, in a more general sense, the controller 38 may be said to vary the phase period and/or the conduction period in response to changes in the supply voltage and/or the rotor speed. Moreover, rather than storing a voltage lookup table or a speed lookup table, the controller 38 may be said to store a power lookup table that comprises different control values for different supply voltages and/or rotor speeds. Each control value then achieves a particular input power at that particular voltage and/or speed point. The controller 38 then indexes the power lookup table using the supply voltage and/or the rotor speed to select a control value from the power lookup table. The control value is then used to define the phase period or the conduction period.

When operating in steady-state mode, the controller 38 divides each electrical half-cycle into a conduction period followed by a freewheel period. The controller 38 then excites the phase winding 26 during the conduction period and freewheels the phase winding 26 during the freewheel period. The phase current is not expected to exceed the current limit during the conduction period and thus the controller 38 switches from excitation to freewheeling only once during each electrical half-cycle. The power lookup table then stores control values that are used to define the phase or the length of the conduction period. However, the controller 38 could conceivably employ an alternative scheme for controlling the excitation of the phase winding 26 when operating in steady-state mode. For example, the controller 38 may employ the same scheme as that employed in acceleration mode. In this instance, the control values stored by the power lookup table may be used to define the current limit or the length of the freewheel period. Accordingly, in a more general sense, the control value may be said to define an attribute of excitation, e.g. phase period, conduction period, current limit or freewheel period. Irrespective of what attribute the control value defines, the temperature compensation value, when applied to the control value, causes the motor 20 to be driven at different input power.

In the embodiment described above, the controller 38 applies a compensation value to a control value when the temperature of the motor assembly 2 drops below a threshold corresponding to a steady-state temperature. Additionally, the magnitude of the compensation that is applied to the control value is temperature dependant. However, the threshold need not correspond to the steady-state temperature. Moreover, there may be instances for which it is sufficient to employ a single, fixed compensation value, i.e. one that is not temperature dependent. For example, one might simply wish to ensure that the input power of the motor 20, when operating over a range of temperatures, does not become excessive. So, for example, if we consider the example illustrated in FIG. 11, the controller 58 might employ a temperature threshold of 25 deg C. below which a fixed compensation value is applied that results in a decrease in input power of 8 W. The input power of the motor 20 would then increase from 350 W at 54 deg C. to 358 W at 25 deg C. The input power then drops by 8 W to 350 W and increase to 358 W at 0 deg C. Consequently, the input power of the motor 20 over the full temperature range does not exceed 358 W and thus, in comparison to the situation in which no compensation is applied, the overall power consumption of the motor 20 is reduced.

The motor assembly 2 comprises a motor 20 having a permanent-magnet rotor 21. The controller 38 then employs a method that reacts to changes in the input power of the motor 20 that arise due to changes in the temperature of the magnet 24. However, the method is not limited to permanent-magnet motors. The phase winding 26 as well as electrical components of the control circuit 30 (e.g. power switches, voltage rails etc.) have resistances that typically increase with temperature. Consequently, the power losses associated with the phase winding 26 and the control circuit 30 will be lower at lower temperatures. Accordingly, the method employed by the controller 38 may be used to reduce the power consumption of other types of brushless motor. For a permanent-magnet motor, the phase winding is typically commutated at times relative to zero-crossings in the back EMF induced in the phase winding. The phase period, T_PHASE, therefore corresponds to the interval between commutation and a zero-crossing in the back EMF. For a reluctance motor, on the other hand, the phase winding is typically commutated at times relative to minima in the inductance of the phase winding. The phase period then corresponds to the interval between commutation and a minimum in the inductance.

The invention claimed is:

1. A method of controlling a brushless motor, the method comprising: measuring a temperature of the motor; adjusting a control value in the event that the measured temperature is lower than a threshold; and exciting a winding of the motor, wherein the control value is used to define an attribute of excitation, and the adjustment to the control value reduces the input power of the motor.

2. The method of claim 1, wherein the control value is adjusted such that the input power of the motor is reduced by a larger amount in response to a lower measured temperature.

3. The method of claim 2, wherein adjusting the control value comprises applying a compensation value to the control value, the compensation value is temperature dependent, and a larger compensation value is applied to the control value in response to a lower temperature such that the reduction in the input power is larger.

4. The method of claim 3, wherein the method comprises storing a temperature lookup table that comprises a compensation value for each of a plurality of temperatures, and indexing the temperature lookup table using the measured temperature to select the compensation value.

5. The method of claim 1, wherein the method comprises adjusting the control value such that the difference between the input power of the motor at the measured temperature and the input power of the motor at the threshold temperature is smaller when the control value is adjusted.

6. The method of claim 1, wherein the input power of motor at the threshold temperature is A, the input power of the motor at the measured temperature when the control value is adjusted is B, the input power of the motor at the measured temperature when the control value is not adjusted is C, and the method comprises adjusting the control value such that |A−B|<|A−C|.

7. The method of claim 1, wherein the input power of motor at the threshold temperature is A, the input power of the motor at the measured temperature when the control value is adjusted is B, and the method comprises adjusting the control value such that difference between A and B is no more than 1% of A.

8. The method of claim 1, wherein the method comprises adjusting the control value in the event that the measured temperature is within a range of temperatures spanning at least 40 deg C.

9. The method of claim 1, wherein the method comprises employing a threshold that depends on the speed of the motor.

10. The method of claim 9, wherein the method comprises employing a higher threshold in response to a higher motor speed.

11. The method of claim 1, wherein the control value is adjusted such that the input power of the motor is reduced by a larger amount in response to a higher motor speed.

12. The method of claim 11, wherein adjusting the control value comprises applying a compensation value to the control value, the compensation value depends on the speed of the motor, and a larger compensation value is applied to the control value in response to a higher motor speed such that the reduction in the input power is larger.

13. The method of claim 12, wherein the method comprises storing a temperature lookup table that comprises a compensation value for each of a plurality of motor speeds, measuring the speed of the motor, and indexing the temperature lookup table using the measured motor speed to select the compensation value.

14. The method of claim 1, wherein the control value defines the phase or the length of excitation.

15. The method of claim 14, wherein the method comprises exciting the winding at times relative to zero-crossings of back EMF or rising inductance in the winding by a phase period, and exciting the winding for a conduction period, and the control value defines the phase period or the conduction period.

16. The method of claim 1, wherein the method comprises dividing each half of an electrical cycle of the motor into a conduction period followed by freewheel period, and the control value defines one of a phase and a length of the conduction period.

17. The method of claim 1, wherein the motor comprises a rotor having a permanent magnet, and the measured temperature is proportional to the temperature of the magnet.

18. A method of controlling a brushless motor, the method comprising:
storing a power lookup table, the power lookup table comprising a control value for each of a plurality of voltages or speeds;
measuring the magnitude of a supply voltage or the speed of the motor;
indexing the power lookup table using the measured voltage or speed to select a control value;
measuring a temperature of the motor;
applying a compensation value to the selected control value in the event that the measured temperature is lower than a threshold; and
exciting a winding of the motor with the supply voltage, wherein the selected control value defines an attribute of excitation, and the compensation value when applied to the selected control value reduces the input power of the motor.

19. A method of controlling a brushless motor, the method comprising:
storing a power lookup table, the power lookup table comprising a control value for each of a plurality of voltages or speeds;

storing a temperature lookup table, the temperature lookup table comprising a compensation value for each of a plurality of temperatures;

measuring the magnitude of a supply voltage or the speed of the motor;

measuring a temperature of the motor assembly;

indexing the power lookup table using the measured voltage or speed to select a control value;

indexing the temperature lookup table using the measured temperature to select a compensation value;

applying the selected compensation value to the selected control value to obtain a temperature-compensated control value; and exciting a winding of the motor with the supply voltage, wherein the temperature-compensated control value is used to define an attribute of excitation.

20. The method of claim 19, wherein the temperature lookup table comprises compensation values that when applied to the selected control value ensure that the input power of the motor at the measured voltage or speed point is substantially the same across a range of temperatures.

21. The method of claim 20, wherein the range of temperatures spans at least 40 deg C.

22. A control circuit for controlling a brushless motor, the control circuit being configured to: measure a temperature of the motor; adjust a control value in the event that the measured temperature is lower than a threshold; and excite a winding of the motor, wherein the control value is used to define an attribute of excitation, and the adjustment to the control value reduces the input power of the motor.

23. The control circuit of claim 22, wherein the control circuit is included in a motor assembly for a brushless motor.

24. The control circuit of claim 23, wherein a compressor comprises an impeller and the motor assembly including the control circuit, and the impeller is driven by the motor assembly and generates an airflow that cools the motor assembly.

25. A control circuit for controlling a brushless motor, the control circuit being configured to:

store a power lookup table, the power lookup table comprising a control value for each of a plurality of voltages or speeds;

store a temperature lookup table, the temperature lookup table comprising a compensation value for each of a plurality of temperatures;

measure the magnitude of a supply voltage or the speed of the motor;

measure a temperature of the motor assembly;

index the power lookup table using the measured voltage or speed to select a control value;

index the temperature lookup table using the measured temperature to select a compensation value;

apply the selected compensation value to the selected control value to obtain a temperature-compensated control value; and excite a winding of the motor with the supply voltage, wherein the temperature-compensated control value is used to define an attribute of excitation.

26. The control circuit of claim 25, wherein the control circuit is included in a motor assembly for a brushless motor.

27. The control circuit of claim 26, wherein a compressor comprises an impeller and the motor assembly, and the impeller is driven by the motor assembly and generates an airflow that cools the motor assembly.

* * * * *